United States Patent Office 3,734,857
Patented May 22, 1973

---

3,734,857
LIQUID PETROLEUM HYDROCARBONS CONTAINING AZO DYES
Ugo Moiso, Saronno, and Sisto Papa, Milan, Italy, assignors to Aziende Colori Nazionali Affini Acna S.p.A., Milan, Italy
No Drawing. Filed Mar. 10, 1971, Ser. No. 123,040
Claims priority, application Italy, Mar. 11, 1970, 21,749/70
Int. Cl. C10m 1/20, 1/32; C10l 1/22
U.S. Cl. 252—51.5 R
4 Claims

ABSTRACT OF THE DISCLOSURE

Concentrates of azo dyes in organic solvents are useful in coloring various materials, including inks, synthetic plastic materials, wood substitutes and, in particular petroleum derivatives like gasoline, lubricating oils, and other similar liquid petroleum distillates and for other purposes.

THE PRIOR ART

As is known, it is desirable to color the petroleum products for various purposes, including identification and denaturation.

Azo dyes have been used for the coloring, commonly in the solid state, that is in the form of powders, granules, flakes, and so on.

The use of the known azo dyes for the purposes indicated is accompanied by many difficulties.

If used in powder form, the known solvent-containing dyes are unpleasant and inconvenient to handle, insofar as they originate environmental dust. If used in the form of agglomerates, the rate at which the dyes are solubilized is slow, which limits the range of possible uses.

On the other hand, with the known solvent-containing azo dyes [compare, e.g., C.I., 2nd ed., 1956, Nos. 11020, 12055, 26100 and 26105], it is not possible to employ concentrated solutions of the dyes which have been prepared in advance of being used, inasmuch as the solubility of those azo dyes in organic solvents is extremely limited, generally not greater than 2% to 5%. The low solubility of the known dyes of the azo class in organic solvents makes their use very expensive, due to the large quantity of solvent, which must be employed, the apparatus required, and the high handling costs.

Even fluid pastes comprising a relatively high concentration of a solid azo dye of the known, poorly soluble type, finely divided in the support or vehicle, present the problem that it is not possible to obtain, rapidly, a homogeneous distribution of the dye in the material to be colored.

THE PRESENT INVENTION

We have now found, surprisingly, that azo dyes having the Formula I set forth below are very soluble in organic solvents, the solubility being such that it is possible to prepare solutions thereof having a very high concentration. In some instances, solutions containing up to 70% by weight of the new azo dyes can be prepared.

The highly concentrated solutions are fluid and stable, and can be mixed immediately and completely with the petroleum distillates by simply pouring, pumping or otherwise introducing the concentrated solutions into the distillate to be colored. Use of the stable, fluid solutions offers many advantages, also, in connection with automation of the mixing operations and in connection with the maintenance of sanitary conditions in the rooms in which the coloring operations are carried out.

The new dyes have the general formula

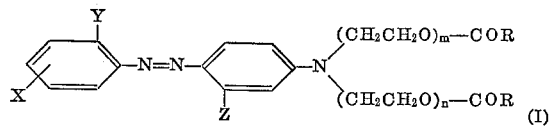

(I)

in which X is hydrogen, 4-Cl, 4-NO$_2$, 3-NO$_2$, lower alkyl or 4-phenylazo, optionally having its phenyl radical substituted, preferably by lower alkyls; Y is H, Cl, Br, NO$_2$, CN, lower alkyl or lower alkoxy; R is CH$_3$ or C$_2$H$_5$; Z is H, CH$_3$, or Cl, $m$ is equal to or greater than 1, $n$ is equal to or greater than 1, and the sum of $m+n$ has, on the average, a value from 3 to 10, preferably from 5 to 7.

The new dyes are prepared, in accordance with this invention, by coupling a diazo compound having the general formula

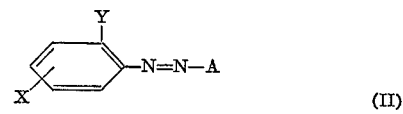

(II)

in which X and Y have the same meaning as in Formula I and A is an anionic residue, with a tertiary aromatic amine having the general formula

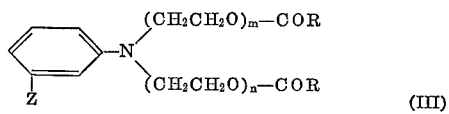

(III)

in which Z, $m$, $n$ and R are the same as in Formula I.

An alternative process for preparing the new azo dyes of Formula I, in accordance with this invention, consists in starting with intermediate azo dyes having the general formula

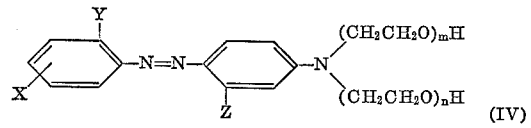

(IV)

in which X, Y, Z and $m+n$ are the same as in Formula I, and esterifying said intermediate azo dyes, in an anhydrous medium, with aliphatic acids in which C equals 2 or 3, or with anhydrides or halides of the aliphatic acids. The anhydrous medium in which the esterification is effected is an organic solvent such as, for example, toluene or xylene.

The dyes according to the present invention are preferably marketed in the form of a liquid containing a high concentration of the dye. Such liquid state is generally attained directly, during the separation of the dye from the final reaction mass by the addition thereto of suitable organic solvents, such as toluene, xylene, nonylphenol, dodecylphenol, methyl salicylate, diisobutyl-phthalate, diisooctyl-phthalate, and the like.

This invention has other technical advantages additional to those already mentioned and which depend on the exceptionally high degree to which the new azo dyes are soluble inorganic solvents.

One of the additional advantages is that due to the presence therein of ether groups, which exert a strong coloring action in comparison with the known azo dyes having the most closely similar structure and containing only ester groups in the aliphatic groups bound to the nitrogen atom, at equal molecular weight, the new soluble azo dyes give deeper shades and a higher coloring yield for the amount of dye used.

The following examples are given to illustrate the invention, and are not intended to be limiting.

EXAMPLE 1

18.3 of 2,4-dinitroaniline are fed into 50 ml. of a sulfuric solution of nitrosyl sulfuric acid (containing 0.11 g. mols of nitrosyl sulfuric acid) in 30 minutes, at a temperature not exceeding 20° C.

The whole is stirred for one hour. The diazotization mass is discharged into 100 g. of ice. The excess $HNO_2$ is removed and the solution is clarified with the aid of a ply-filter, to obtain a limpid solution having a volume of 180 ml. The diazo-solution is transferred into a glass having a 1000 ml. capacity.

The glass is externally cooled to −10° C. with brine and the solution of 41 g. diacetylated N,N-polyoxyethyl-metatoluidine (average M.W. 411; average $m+n=5$; cf. table) in 200 ml. water and 13 ml. HCl 20° Bé. is poured off in about 1 hour. The dye precipitates in the form of crystals. At the end of the coupling reaction, 250 ml. xylene are added and the pH is brought to about 8 by pouring 140 ml. NaOH 36° Bé. from a tap funnel, in about 1 hour. Contemporaneously, the temperature is caused to rise to 15–20° C. The whole is kept under stirring for about 2 hours. The mass is transferred into a separating funnel and the aqueous phase is decanted. The xylene mass is washed by shaking and decanting with $H_2O$ (1000 ml. in 4 parts), clarified in a ply-filter, transferred into a distillation flask and the excess solvent is distilled under vacuum (30 mm. Hg; 50° C.) until the desired dye concentration (about 50–60% by weight) is reached.

A fluid mass is obtained, which is stable (even at 0° C.), and which colors the petroleum products red-bluish.

EXAMPLE 2

17.25 g. 2-chloro-4-nitroaniline are suspended in 50 ml. water at 60° C. and 50 ml. 10 N HCl.

The suspension is allowed to cool to room temperature under stirring. 100 g. of ice are added and diazotization is carried out by rapidly pouring below level a 20% aqueous $NaNO_2$ solution. The solution is stirred for 2 hours at 0–3° C. The excess $HNO_2$ is removed and the solution is clarified in a ply-filter. Limpid solution, volume 280 ml. The diazo solution is transferred into a 1000 ml. glass, and, at a starting temperature of 0–30, the solution of 40 g. diacetylated N,N-polyoxyethyl aniline (average M.W. 397.4); (average $m+n=5$) in 200 ml. water and 15 ml. HCl 20° Bé. at 15–20° C. is poured in over a period of about 1 hour. The temperature rises to 10–15° C.; the dye precipitates in a semi-liquid pitchy form which does not prevent stirring. Aafter about one hour stirring, the pH is raised to 3.5–3.7 by pouring in about 200 ml. of a 50% solution of Na acetate. Stirring is continued for 1 hour, 200 ml. xylene are added and stirring is carried on for some hours. The mass is transferred into a separating funnel and the aqueous phase is decanted.

The xylene mass is washed by shaking and decanting with $H_2O$ (about 1000 ml. in 3 parts), it is clarified in a ply-filter, transferred into a distillation flask and the excess solvent is distilled under vacuum (20 mm. Hg; 45° C.) until the desired dye concentration (about 50% by weight) is reached. A mass is obtained, which is fluid even at 0° C., stable, and colors the liquid petroleum distillates red.

EXAMPLE 3

13.8 g. 4-nitroaniline are suspended in 10 ml. water and 38 ml. of a solution containing 20% $NaNO_2$. The suspension is stirred for some hours and the mass obtained is poured in the form of a fine stream of water, in 3–5 min., in 140 ml. $H_2O$, 30 ml. HCl 20° Bé. and 50 g. ice, while stirring well. Stirring is carried on for 1 hour at 10–15° C. in order to complete the diazotization. The excess $HNO_2$ is removed and the mass is clarified with the aid of a ply-filter. A limpid solution having a volume of 30 ml. is obtained.

The diazo solution is transferred into a 1000 ml. glass. The glass is cooled externally to 5° C. using brine and the solution of 41 g. diacetylated N,N-polyoxyethyl-m-toluidine (average M.W. 411) (average $m+n=5$) in 150 ml $H_2O$ and 15 ml. HCl 20° Bé. is poured off in about 1 hour at 15–20° C. The temperature rises to 10–15° C. the dye precipitates in the form of a soft pitch which does not prevent stirring. After approximately 1 hour stirring, the pH is raised to about 3 using 200 ml. of a solution containing 50% Na acetate.

Stirring is carried on for one hour. 200 ml. xylene are added and the whole is kept under stirring for some hours. The mass is transferred into a separating funnel and the aqueous phase is decanted. The xylene mass is washed by shaking and decanting with brine having a 5% salt content (about 1000 ml. in 3 parts), clarified using a ply-filter, transferred into a distillation flask, and the excess solvent is distilled under vacuum (20 mm. Hg; 45° C.) until the desired dye concentration (about 50% by weight) is reached.

A mass is obtained, which is fluid even at 0° C., stable and colors gasoline orange.

Similarly, when substituting the 3-nitroderivative for 4-nitroaniline a yellow-reddish dye is obtained which has analogous characteristics.

EXAMPLE 4

16.2 g. 2,5-dichloroaniline are suspended in 50 ml. water and 50 ml. HCl 20° Bé. The suspension is kept under stirring over the night. 100 g. ice are added and the suspension is diazotized by rapidly pouring below level a 20% $NaNO_2$ aqueous solution. The whole is stirred for two hours at 0–3° C. The excess $HNO_2$ is removed and the solution is clarified in a ply-filter. A limpid solution having a volume of 300 ml. is obtained. The diazo solution is transferred into a 1000 ml. glass and, at a starting temperature of 0–3°, the solution of 41 g. diacetylated N,N-polyoxyethyl metatoluidine (average $m+n=5$; average M.W. 411.5) in 200 ml. water and 15 ml. HCl 20° Bé. is poured off in about 1 hour at 15–20° C. The temperature rises to 10° C.; the dye precipitates in a fluid soft form which does not prevent stirring. After about 1 hour stirring, the pH is raised to about 3 by pouring about 200 ml. of a 50% solution of Na acetate. Stirring is carried on for 1 hour, 250 ml. xylene are added and the whole is stirred for one hour. The mass is transferred into a separating funnel and the aqueous phase is decanted. The xylene mass is washed by shaking and decanting with $H_2O$ (1000 ml. in 3 parts), clarified in a ply-filter, transferred into a distillation flask and the excess solvent is distilled under vacuum (20 mm. Hg; 40–45° C.) until the desired dye-concentration (about 50% by weight) is reached.

A mass is obtained, which is fluid even at 0° C., stable and colors gasoline yellow-reddish.

EXAMPLE 5

22.5 g. 3,2-dimethyl-4-aminoazobenzene are suspended in 130 ml. water, 17 ml. 10 HCl and 0.3 g. Aerosol OT.

The suspension is stirred during the night. 130 g. ice are added and diazotization is effected at 5° C., by pouring in 15 minutes an excess of $NaNO_2$ in a 20% solution. Stirring is carried on for 1 hour at 10° C. 50 g. NaCl are added in order to complete the precipitation of the diazonium salt. The whole is filtered and washed up to neutralization with brine having a 20% salt content. The solution of 44 g. di-ester propionic N,N-polyoxyethyl-metatoluidine (average $m+n=5$; average M.W. 439.5) in 400 ml. $H_2O$ and 15 ml. HCl 20° Bé. is fed in a 1000 ml. glass. The diazo cake is fed in about 30 min. into the coupling solution at 10° C. The dye separates in a soft form.

At the end of the coupling reaction, 250 ml. xylene are added and the pH is lowered to about 3 with Na acetate solution (50% w./v.). Stirring is carried on for some hours. The mass is transferred into a separating funnel and the aqueous phase is decanted. The xylene mass is washed by shaking and decanting with $H_2O$ (1000 ml. in 3 parts), clarified with the use of a ply-filter, transferred into a distillation flask and the excess solvent is distilled under vacuum (20 mm. Hg at 40–45° C.) until the desired dye concentration (about 50% by weight) is reached.

A mass is obtained which is fluid, even at 0° C., stable and colors the petroleum distillates orange-reddish.

EXAMPLE 6

9.3 g. aniline are dissolved in 100 ml. water and 22.5 ml. 10 N HCl. Ice is added and diazotization is effected at 0° C. by pouring in a 20% $NaNO_2$ solution. Limpid solution; volume 250 ml. After stirring for 30 minutes the excess $HNO_2$ is removed.

The diazo solution is transferred into a 1000 ml. glass and the solution of 43 g. propionic diester N,N-polyoxyethylaniline (average $m+n=5$; average M.W. 425.5) in 200 ml. $H_2O$ and 15 ml. HCl 20 Bé is poured off in about 30 min. The dye separates in a semi-fluid soft form. Stirring is carried on for about 1 hour and the pH is raised to about 3.5, by pouring in 30 minutes at 50% solution of Na acetate. The coupling reaction is completed during the night.

The following morning, 250 ml. xylene are added and stirring is carried on for 3 hours. The mass is transferred into a separating funnel and the aqueous phase is decanted. The xylene mass is washed by shaking and decanting with brine having a 5% salt content (1000 ml. in 3 parts), clarified with the use of a ply-filter, transferred into a distillation flask and the excess solvent is distilled under vacuum (20 mm. Hg; 45° C.) until the desired dye concentration (up to 70% by weight) is reached.

A mass is obtained which is fluid even at 0° C., stable, and colors gasoline yellow.

The formulae of the dyes obtained according to Examples 1 to 6 are shown in the table below.

TABLE (Formulae of the dyes of Examples 1–6)

(1) 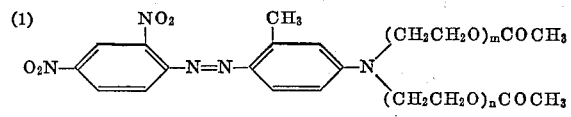

the sum $m+n$ has an average value of 5.

(2) 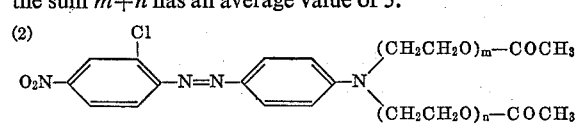

the sum $m+n$ has an average value of 5

(3) 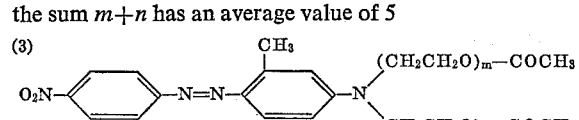

the sum $m+n$ has an average value of 5

(4) 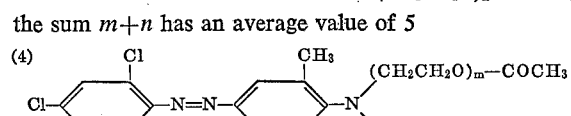

the sum $m+n$ has an average value of 5

(5) 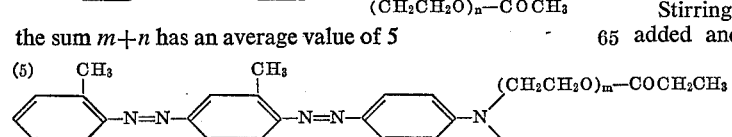

the sum $m+n$ has an average value of 5

(6) 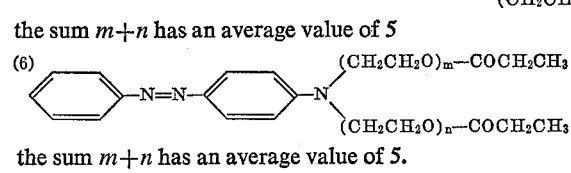

the sum $m+n$ has an average value of 5.

EXAMPLE 7

Preparation of the coupling agent

A 1 liter capacity autoclave is fed with 1.5 mols m-toluidine; the air is removed by a nitrogen stream. The autoclave is heated to 120–5° C. and at this temperature, 7.5 mols ethylene oxide are fed in 24 hours. The whole is kept at a temperature of 120–5° C. for 10 hours and is then cooled.

The reaction mass is acetylated in a 2 liter capacity flask by heating in countercurrent for 2 hours with a quantity of acetic anhydride twice as high as the weight of the oxyethylated product obtained in the preceding step (about 9 mols).

The excess acetic anhydride and the acetic acid freed during the reaction are distilled under vacuum (50 mm. Hg).

A product is obtained, which has an average M.W. of 411 and consists of a mixture of substances having an average content of 5 ethylene oxide units. Operating similarly, similar copulants derived from aniline, ethylene oxide and acetic (or propionic) anhydride are prepared.

Instead of acetic or propionic anhydride, also acetic or propionic acid or the halides thereof may be employed.

EXAMPLE 8

18.3 g. 2,4-dinitroaniline are diazotized as described in Example 1. The diazo-solution is transferred into a 1,000 ml. glass. The glass is cooled to −10° C. by an externally arranged brine circulating bath and the solution of 33 g. diacetylated N,N - polyoxyethyl - m - toluidine (average $m+n=3$; average M.W. 323.4) in 200 ml. water and 13 ml. HCl 20° Bé is poured off. The dye precipitates in a crystalline form. At the end of the coupling reaction, 250 ml. xylene are added and the pH is raised to about 8 by pouring from a tap funnel in about 1 hour 140 ml. NaOH 36° Bé. The temperature is contemporaneously raised to 15–20° C. Stirring is carried on for about 2 hours. The mass is transferred into a separating funnel and the aqueous phase is decanted. The xylene mass is washed by shaking and decanting with $H_2O$ (about 1000 ml. in 4 parts), clarified with the use of a ply-filter, transferred into a distillation flask and the excess solvent is distilled under vacuum (30 mm. Hg; 50° C.) until the desired dye concentration is reached (50–60% by weight). A mass is obtained which is fluid (even at 0° C.), stable, and colors the petroleum products red-bluish.

EXAMPLE 9

17.25 g. 2-chloro-4-nitroaniline are diazotized as described in Example 2.

The diazo-solution is transferred into a 1000 ml. glass and the solution of 57.5 g. diacetylated N, N-polyoxyethylaniline (average M.W. 573.7; average $m+n=9$) in 200 ml. water and 15 ml. HCl 20° Bé. is poured therein in about 1 hour. The temperature rises to 10–15° C., and the dye precipitates in a soft pitchy form which does not prevent stirring. After about 1 hour stirring, the pH is raised to 3.5–3.7 by pouring about 200 ml. solution containing 50% Na acetate.

Stirring is carried on for one hour, 200 ml. xylene are added and stirring is carried on for some hours. The mass is transferred into a distillation flask and the excess solvent is distilled under vacuum (20 mm. Hg; 45° C.) until the desired dye concentration (about 50% by weight) is obtained. A mass is obtained, which is fluid, stable and colors the petroleum products red.

The formulae for the dyes obtained according to Examples 8 and 9 are as follows:

(8) 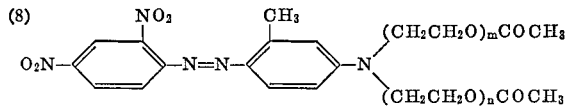

the sum $m+n$ has an average value of 3

(9) 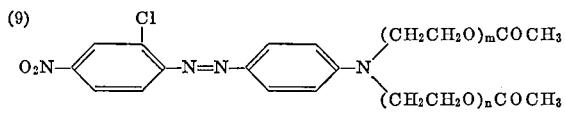

the sum $m+n$ has an average value of 9.

EXAMPLE 10

17.25 g. 2-chloro-4-nitro-aniline are diazotized as described in Example 2.

The diazo solution is transferred into a 1000 ml. glass, cooled to −10° C. with the aid of an externally arranged brine circulation bath and the solution of 41 g. diacetylated N,N-polyoxyethyl-m-toluidine (average value $$m+n=5$$

average M.W. 411) in 300 ml. H₂O, and 13 ml. HCl 20° Bé. is poured therein in about one hour. The dye precipitates in a pitchy form. After about 2 hours stirring, 250 ml. xylene are added and the pH is raised to about 7–8 by pouring in 25–30 minutes 73 ml. of a solution containing a NaOH 36° Bé. (temperature 10–15° C.). Stirring is carried on for some hours, the mass is transferred into a separating funnel and the aqueous phase is decanted. The xylene mass is washed by shaking and decanting with H₂O (about 1000 ml. in 3 parts), clarified with the aid of a ply-filter, transferred into a distillation flask and the excess solvent is distilled under vacuum (20 mm. Hg; 45° C.) until the desired dye concentration (about 50% by weight) is obtained. A mass is obtained, which is fluid, stable and colors the petroleum products red.

The formula of the dye obtained according to this example is as follows:

(10) 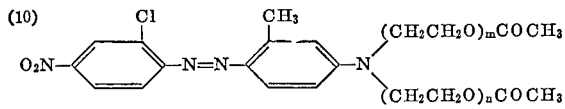

the sum $m+n$ has an average value of 5.

As will be apparent, various changes and modifications in details can be made in practicing this invention, without departing from its spirit. Therefore, we intend to include, in the scope of the appended claims, all such variations and modifications as will be obvious to those skilled in the art from the description and working examples given herein.

What is claimed is:

1. Liquid hydrocarbons derived from the distillation of petroleum containing a liquid organic solvent solution of a water-insoluble dye having the general formula

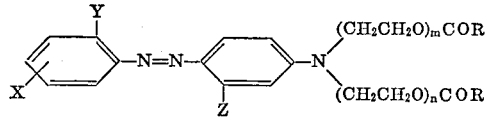

in which

X is selected from the group consisting of hydrogen 4-Cl, 4-NO₂, 3-NO₂, lower alkyl radicals, 4-phenylazo group and the 4-phenylazo group the phenyl radical of which is lower alkyl-substituted, Y is selected from the group consisting of H, Cl, Br, NO₂, CN, lower alkyl groups and lower alkoxy groups; R is selected from the group consisting of CH₃ and C₂H₅;

Z is selected from the group consisting of H, CH₃ and Cl;

m is equal to or greater than 1, n is equal to or greater than 1, and the average value of the sum of $m+n$ is from 3 to 10, the concentration of the dye in the solvent is up to about 70% by weight.

2. Gasoline and lubricating oil containing a liquid organic solvent solution of a water-insoluble dye according to claim 1.

3. Liquid hydrocarbons derived from the distillation of petroleum containing a liquid organic solvent solution of a water-insoluble dye as defined in claim 1, in which said organic solvent is selected from the group consisting of toluene, xylene, nonylphenol, dodecylphenol, methyl salicylate, diisobutyl phthalate and diisooctyl phthalate.

4. Gasoline and lubricating oil containing a water-insoluble dye as defined in claim 1, in which said organic solvent is selected from the group consisting of toluene, xylene, nonylphenol, dodecylphenol, methyl salicylate, diisobutyl phthalate and diisooctyl phthalate.

References Cited

UNITED STATES PATENTS 3,407,189  10/1968  Merian _____ 252—51.5 R
3,534,016  10/1970  Lange _____ 44—59 X DANIEL E. WYMAN, Primary Examiner
W. J. SHINE, Assistant Exmainer U.S. Cl. X.R.
44—59; 260—207.1

UNITED STATES PATENT OFFICE
CERTIFICATE OF CORRECTION

Patent No. USP 3,734,857          Dated      May 22, 1973

Inventor(s)   Ugo Moiso and Sisto Papa

It is certified that error appears in the above-identified patent and that said Letters Patent are hereby corrected as shown below:

Col. 3, line 10   (Example 2) "0-30" should read - - -0-3° - - -;

line 75 (Example 3) "30 ml." should be - - -300 ml- - -.

Col. 4, line 27 (Example 4) "16.2 g. 2,5-dichloroaniline" should read

- - -16.2 g. 2,4-dichloroaniline- - -;

line 59 (Example 5) "10 HCl" should be - - -10N HCl- - -.

Col. 5, line 13 (Example 6) "dissolved" should read - - -solved- - -;

line 15, "in a" should be - - -a- - -.

Signed and sealed this 9th day of April 1974.

(SEAL)
Attest:

EDWARD M.FLETCHER,JR.
Attesting Officer

C. MARSHALL DANN
Commissioner of Patents